United States Patent [19]

Franks

[11] Patent Number: 4,684,304
[45] Date of Patent: Aug. 4, 1987

[54] COMPOSITE STUD

[75] Inventor: Theodore E. Franks, Long Beach, Calif.

[73] Assignee: Hitco, Newport Beach, Calif.

[21] Appl. No.: 855,236

[22] Filed: Apr. 24, 1986

[51] Int. Cl.$^4$ .......................... F16B 37/06; B63B 3/00
[52] U.S. Cl. .................................... 411/171; 411/383; 411/900; 411/914; 114/79 W
[58] Field of Search .............. 411/171, 378, 383, 900, 411/901, 902, 903, 904, 914, 955, 82; 114/88, 79 W, 312, 74 A; 148/234; 228/263.11

[56] References Cited

U.S. PATENT DOCUMENTS

| | | |
|---|---|---|
| 910,434 | 1/1909 | Thompson . |
| 1,982,098 | 11/1934 | Hartmann ...................... 411/171 X |
| 2,153,702 | 4/1939 | Tighe ................................... 411/378 |
| 2,413,370 | 12/1946 | Palmer .............................. 411/82 X |
| 2,563,107 | 8/1951 | Fanger ............................ 411/902 X |
| 3,279,517 | 10/1966 | Logan ................................... 411/171 |
| 3,848,389 | 11/1974 | Gapp et al. . |
| 3,900,382 | 11/1976 | Lootvoet .......................... 114/74 A |

Primary Examiner—Gary L. Smith
Assistant Examiner—Neill Wilson
Attorney, Agent, or Firm—Ted C. Gillespie; Paul J. Rose; Ronald E. Champion

[57] ABSTRACT

The composite stud is mainly a corrosion-resistant alloy, but is provided with a steel tip for flawless welding to a steel plate for use in a marine environment. The steel tip is friction-welded to the corrosion-resistant alloy before machining of the stud.

3 Claims, 2 Drawing Figures

COMPOSITE STUD

TECHNICAL FIELD

This invention relates generally to the fastening of fairings to submarines, and more particularly to a composite stud simplifying such fastening.

BACKGROUND ART

A fairing is customarily secured to a submarine by first welding a plurality of steel anchoring structures in place on the outer side of the hull and then securing the fairing to the anchoring structures. The anchoring structures frequently include a contoured plate matching the contour of the fairing and are generally rather complex. A much simpler fastening method would be to secure the fairing on studs which could be rapidly and easily welded in place with a conventional electric stud welding gun. It is required that the studs be corrosion resistant. One of the most widely used materials for corrosion resistance in marine applications is Inconel, a nickel alloy (Inconel is a trademark of The International Nickel Co., Inc.). Unfortunately, however, Inconel studs applied with a stud welding gun do not form satisfactory welds with steel. Cracks occur in the weld metal immediately upon cooling, leading to early failure of the weld under stress.

DISCLOSURE OF INVENTION

In accordance with the invention, a composite stud is provided having steel at one end, the remainder of the stud length being a corrosion-resistant alloy such as Inconel. The steel and the corrosion-resistant alloy are friction-welded together in a conventional friction welding machine to produce a billet from which a composite stud is machined. When such composite studs are welded to a steel panel with a stud gun, the steel end of each stud welds to the panel without cracking in the weld metal. (The weld metal is the part of the welded joint that was fused in its formation.)

BRIEF DESCRIPTION OF DRAWINGS

The invention is more fully explained hereinafter, reference being had to the accompanying drawings wherein.

BEST MODE OF PRACTICING THE INVENTION

Figure 1:
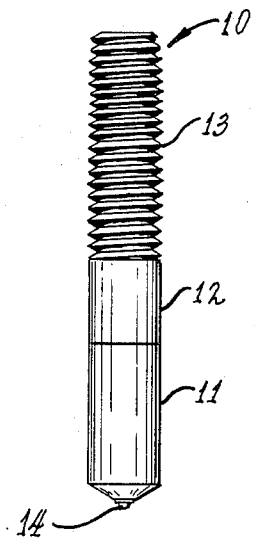
FIG. 1 is a side view of a composite stud constructed in accordance with the invention.

With reference to the drawings, FIG. 1 shows a composite stud 10 constructed in accordance with the invention and comprising a steel inner tip portion 11 and a corrosion-resistant alloy main body portion 12, 13, the alloy portion 12 being of the same diameter as the steel portion 11 and the alloy portion 13 being provided with external threads. The stud 10 is machined from a billet formed from appropriately sized pieces of steel and corrosion-resistant alloy rods friction-welded together. In a succeeding operation, an aluminum flux ball 14 is installed on the end face of the tip portion 11.

Figure 2:
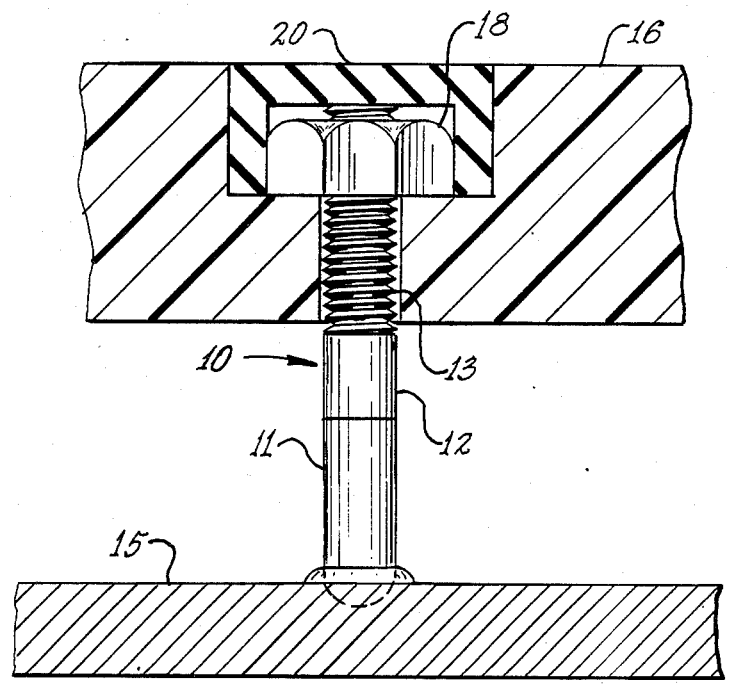
FIG. 2 is a fragmentary sectional view of the composite stud in use.

FIG. 2 shows an example of a stud 10 in use, with the steel tip 11 welded to a steel hull 15 of a submarine and a recessed glass fiber reinforced plastic fairing 16 held in place by a nut 18 threaded on the portion 13 of the stud. The nut 18 is encased in an overlong piece of rubber 20 which fills the recess of the fairing and has its excess length cut off flush. The steel tip 11 and the steel hull 15 are preferably the same kind of steel. For example, they may each be made of HY-80 steel (a designation of the United States Navy). The corrosion-resistant alloy 12, 13 of the stud is preferably Inconel 625, which has the following composition:

| | |
|---|---|
| Carbon | 0.10 max. |
| Manganese | 0.50 max. |
| Iron | 5.0 max. |
| Sulphur | 0.015 max. |
| Silicon | 0.50 max. |
| Chromium | 20.0–23.0 |
| Columbium (+Ta) | 3.15–4.15 |
| Molybdenum | 8.0–10.0 |
| Aluminum | 0.40 max. |
| Titanium | 0.40 max. |
| Cobalt (if determined) | 1.00 max. |
| Nickel | Remainder |

Welding of the composite stud 10 to the hull 15 by an electric stud gun is accomplished without cracking of the weld metal. The hull 15 is painted with a protective coating, as are the steel tips 11 of the studs 10.

Various modifications may be made in the structure shown and described without departing from the scope of the invention.

I claim:

1. A fabricated structure particularly adapted for use in a marine environment and comprising a steel submarine hull, a composite stud including a steel tip portion welded to an outer side of the hull and a main body portion of a corrosion-resistant alloy provided with external threads and forming a major part of the composite stud, a fairing mounted on the stud, and an internally threaded nut threaded on the stud and holding the fairing in place on the hull.

2. A fabricated structure as claimed in claim 1 wherein the main body portion of the composite stud is Inconel.

3. A fabricated structure as claimed in claim 1 wherein the main body portion of the composite stud is Inconel 625.

* * * * *